United States Patent [19]
Haskell et al.

[11] Patent Number: 5,001,561
[45] Date of Patent: Mar. 19, 1991

[54] EMBEDDED CODING SYSTEM FOR VIDEO SIGNALS

[75] Inventors: Barin G. Haskell, Tinton Falls; Amy R. Reibman, East Windsor, both of N.J.

[73] Assignee: AT&T Bell Laboratories, Murray Hill, N.J.

[21] Appl. No.: 517,991

[22] Filed: May 2, 1990

[51] Int. Cl.$^5$ ............................................. H04N 7/133
[52] U.S. Cl. ..................................... 358/133; 364/725
[58] Field of Search ......................... 358/133; 364/725

[56] References Cited
U.S. PATENT DOCUMENTS

| 4,707,738 | 11/1987 | Ferre et al. | 358/133 |
| 4,805,030 | 2/1989 | Tanaka | 358/133 |
| 4,941,043 | 7/1990 | Jass | 358/133 |
| 4,958,226 | 9/1990 | Haskell | 358/136 |

OTHER PUBLICATIONS

"Adaptive Coding of Monochrome and Color Images", IEEE Transactions on Communications, vol. Com. 25, No. 11, Nov., 1977.
Digital Pictures, Representation and Compression by Arun N. Netravali and Barry G. Haskell, pp. 334–340.
Conditional Motion Compensated Interpolation (co— pending application Ser. No. 413,520, filed on Sep. 27, 1989 and allowed on Apr. 5, 1990).

Primary Examiner—Howard W. Britton
Attorney, Agent, or Firm—Thomas Stafford

[57] ABSTRACT

A video processing system is disclosed that separates and separately encodes and decodes the low and high spatial frequency coefficients of images for transmission or storage. Each block of an image is transformed into the frequency domain. High frequency coefficients of the resulting transform matrix are separated from the low frequency coefficients. The low frequency coefficients are motion prediction compensated to derive motion vectors and a prediction error signal. The motion vectors, prediction error signal and high frequency coefficients are channel encoded for storage or transmission. In a receiver, the motion vectors and prediction error signal are used to reconstruct a low frequency motion-compensated version of the image. The high frequency coefficients are inverse transformed into the pel domain and are combined with the reconstructed low frequency verison of the image to reconstruct a version of the original image.

18 Claims, 2 Drawing Sheets

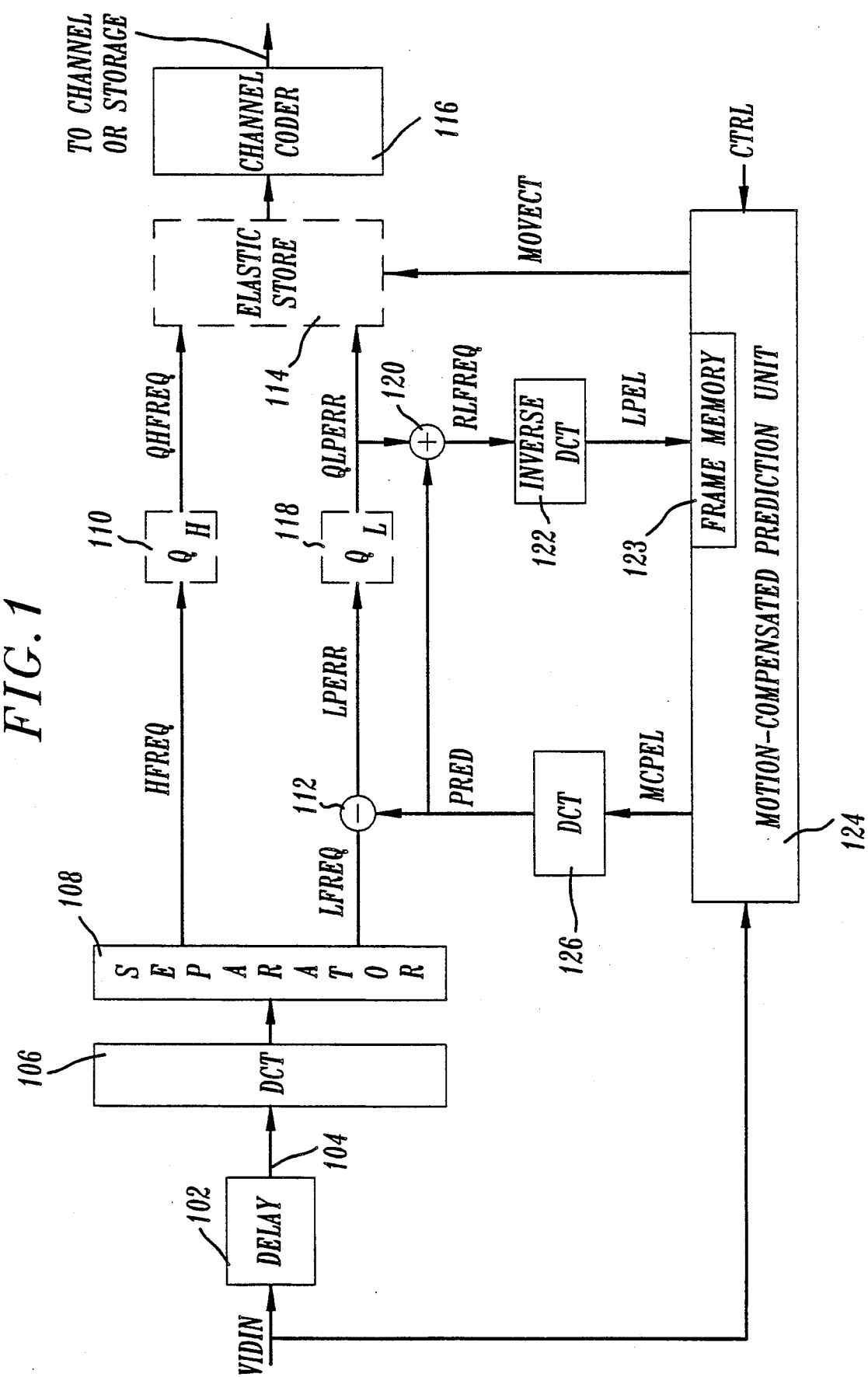

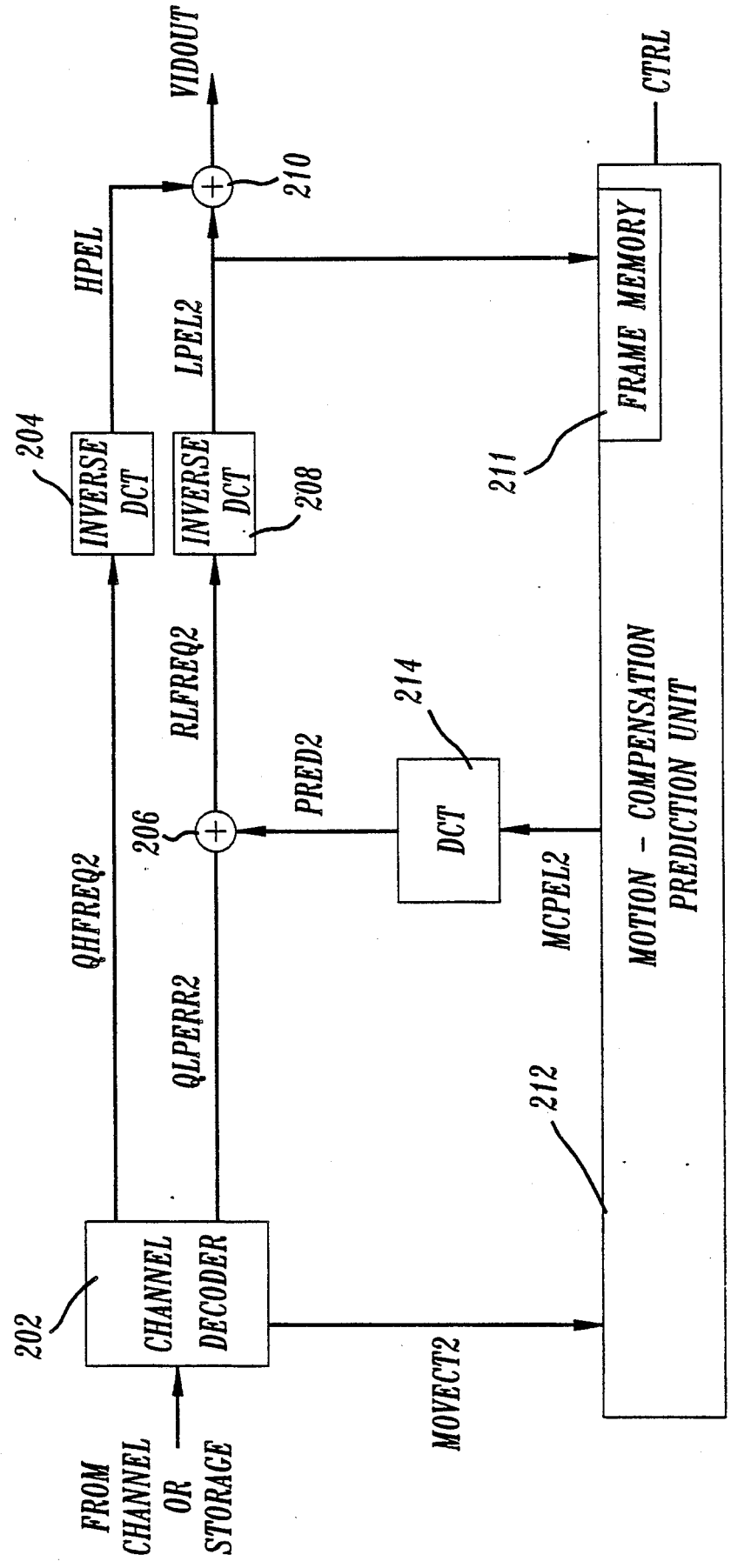

EMBEDDED CODING SYSTEM FOR VIDEO SIGNALS

TECHNICAL FIELD

This invention relates to signal coding system sand, more particularly, to encoding and decoding video signals of moving images suitable for transmission or for storage.

BACKGROUND OF THE INVENTION

Prior video signal interframe coding, transmission and reproduction systems initially encode a base frame image. This base frame image incorporates both the low and the high spatial frequency components of the image. The base frame image is transmitted and thereafter only information representative of the difference between the base frame and each subsequent image is transmitted. Both low and high frequency spatial components are contained within the difference information. Using the base frame image and the subsequent difference information a high quality version, i.e., an accurate or error free representation, of any desired subsequent image can be reconstructed. If difference information is lost during transmission, only a low quality version of the desired image, i.e. an inaccurate or error strewn representation, can be reconstructed. Such prior arrangements are inefficient because they lack the ability to rapidly reproduce high quality images in random access applications. Similarly, this prior arrangement requires a long time to recover from loss of the difference information caused by transmission errors. The inefficiency and delays are caused by the leveraged encoding of each image beyond the base frame since all of the information prior to the selected frame is required, i.e., all the information contained in the base frame and all the difference information relating to each sequentially subsequent image. However, it is known that interframe coding tends to reduce the number of bits that are required to be transmitted.

In a prior attempt to reduce the reconstruction difficulty a new base frame is periodically incorporated into the bit stream. However, this technique dramatically increases the average number of bits required to represent all the information in an average frame because each base frame is encoded using intraframe coding and all of the information representing a base frame is used by each subsequent image. It is known that intraframe coding tens to require a larger number of bits than intraframe coding. In intraframe coding, characteristics of neighboring picture elements (pels or pixels are predicted based on the values of those characteristics of neighboring pels in the same frame, and the error or difference between the actual value and the predicted value is encoded. This type of encoding is illustrated in an article entitled "Adaptive Coding of Monochrome and Color Images", IEEE Trans. Communication, Vol. COM-25, pp. 1285-1292, Nov. 1977.

SUMMARY OF THE INVENTION

The problems with prior image coding and reproduction systems are overcome, in accordance with an aspect of the invention, by encoding and transmitting a low spatial frequency representation of an image using interframe prediction techniques. High spatial frequency coefficients of the image are encoded directly for transmission.

In a specific embodiment of an encoder, a video signal is divided into blocks comprising an array of pels. Each block is transformed into the frequency domain. The high and the low frequency coefficients of each block are separately extracted from the resulting transformed matrix. A version of the original image represented by the low frequency coefficients of each block is motion-compensated to yield a prediction error signal and motion vectors. The prediction error signal, the motion vectors and the high frequency coefficients are encoded using a method suitable to the medium of transmission or storage. The prediction error signal and motion vectors are assigned a high priority. The high frequency coefficients are assigned a low priority and may be dropped by a network during congestion or not retrieved from storage.

A receiver decodes and separates the prediction error signal, the motion vectors and the high frequency coefficients. The prediction error signal and motion vectors are used to reconstruct a motion-compensated version of the low frequency image. The high frequency coefficients are inverse transformed and the resulting reconstructed high frequency version of the image is combined with the reconstructed, motion-compensated low frequency version of the image to produce a reconstructed version of the original image.

BRIEF DESCRIPTION OF THE DRAWING

FIG. 1 shows, in simplified block diagram form, an encoder embodying aspects of the invention; and FIG. 2 shows, in simplified block diagram form, a decoder embodying aspects of the invention.

DETAILED DESCRIPTION

There is some experimental evidence that for regions of high motion in a sequence of moving image frames the interframe correlation of high frequency coefficients of a discrete cosine transform (DCT) of those regions is approximately zero (0). Therefore, the bit-rate to code these coefficients in an intraframe format is not much different than coding them in an interframe frame or Motion Compensated format. FIG. 1 shows an encoder that encodes the high frequency coefficients of a DCT of a sequence of image frames in an intraframe format. An additional DCT beyond those used in prior motion compensated system is used as a low-pass loop-filter to generate a low frequency prediction.

In an example encoder, an original video signal VIDIN is first delayed by delay 102 for reasons to be given later. The delayed signal 104 is then converted from the pel domain to the Discrete Cosine Transform domain by DCT 106. An example DCT 106 groups input pels, i.e. picture elements, into 2-dimensional blocks, e.g., 8×8 pels each. DCT 106 produces a set of output frequency coefficients that are grouped into 2-dimensional blocks of the same size as the input blocks. The transform coefficients supplied as an output by DCT 106 are then partitioned by separator 108 into two groups, namely, high spatial frequency coefficients and low spatial frequency coefficients. The high spatial frequency coefficients HFREQ are selected based upon a predetermined threshold and are supplied to quantizer 110. The remaining low spatial frequency coefficients, LFREQ are supplied to subtracter 112.

High spatial frequency coefficient HFREQ are quantized by quantizer 110. A quantizer reduces the number of levels available for coefficients to assume. The quantizing can optionally be made responsive to the quantity of information stored in elastic store 114 so as to prevent elastic store 114 from overflowing. The output from quantizer 110, QHFREQ, is supplied to elastic store 114 is present. Elastic store 114 subsequently supplies QHFREQ to channel coder 116 for encoding appropriate for transmission or storage, depending on the application. If elastic store 114 is not present, QHFREQ is supplied directly to channel coder 1616 for encoding. Low spatial frequency coefficients LFREQ are coded by interframe prediction techniques that are well known in the art and exploit the correlation normally present between image frames. For example, here we show simple Motion Compensation prediction. (See Digital Pictures Representation and Compression by Arun N. Netravali and Barry G. Haskell, Plenum Press 1988 pp. 334–340.) Other methods might include Conditional Motion Compensated Interpolation (see co-pending application Ser. No. 413,520 filed on Sept. 27, 1989and now U.S. Pat. No. 4,958,226 issued on Sept. 18, 1990).

Low frequency coefficient prediction signal PRED, supplied to subtracter 112, is subtracted from the low frequency coefficients LFREQ to yield an initial low frequency prediction error signal LPERR. Low frequency prediction error signal LPERR is quantized by quantizer 118 and then supplied as low frequency prediction error signal QLPERR to elastic store 114. In turn, QLPERR is subsequently encoded and supplied for transmission by channel coder 116. Data supplied to channel coder 116 from elastic store 114 is encoded using well known reversible data compression methods. A serial bit-stream output that can be transmitted or stored is output from channel coder 116.

It should be noted that in some applications quantizers 110 and 118 and elastic store 114 may be eliminated. If quantizer 118 is eliminated, low frequency prediction error signal LPERR is supplied directly to elastic store 114 and adder 120. Additionally, a significance detector (not shown) may be incorporated into quantizer 118. This detector would determine whether the value of the low frequency coefficients in a block of QLPERR were too small to warrant transmission. Insignificant blocks would be replaced by zero (0) before being supplied as output.

After any significance thresholding is performed, the quantized prediction error signal QLPERR is added to low frequency coefficient prediction signal PRED by adder 120 to produce "reconstructed" low frequency coefficients RLFREQ. These reconstructed coefficients are inverse transformed by INVERSE DCT 122 to form a low frequency pel domain signal LPEL. LPEL is passed into a frame memory 123 of motion compensation prediction unit 124. Motion compensation prediction units are well known in the art. Original signal VIDIN is also supplied to motion compensation prediction unit 124. Dealy 102 is required to insure that coefficients LFREQ correspond in time to predicted coefficients PRED due to the processing delay in motion compensation prediction unit 124. MOtion compensation prediction unit 124 compares each block of the original signal VIDIN with signal LPEL stored in it s frame memory 123 and calculates a motion vector for each block. Motion vectors are necessary to reconstruct a shift-matrix for the motion compensated low frequency version of the image. The motion vectors are supplied as output signal MOVECT to elastic store 114 for subsequent transmission by channel coder 116. Channel coder 116 assigns a higher priority to the low frequency quantized prediction error signal and the motion vectors than is assigned to the high frequency coefficients.

Motion compensation prediction unit 124 also generates MCPEL, which is a block of pels that is shifted by an amount corresponding to each of the aforementioned motion vectors. MCPEL represents the prediction to be used in coding the corresponding block of original pels now being supplied as an output by delay 102. Thus, an original block of pels on signal line 104 passes into DCT 106 at the same time as the corresponding predicted MCPEL block of pels passes into DCT 126. The low frequency coefficients supplied as an output from DCT 126 appear as signal PRED, which is the aforementioned prediction for the low frequency coefficients LFREQ. DCT 126 does not generate any high frequency coefficients.

A corresponding example decoder is shown in FIG. 2. Channel decoder 202 decodes a signal supplied from the channel or from storage and supplies as outputs signals QHFREQ2, QLPERR2 and MOVECT2. Under errorless conditions, a signal with a suffix of 2 is a reconstructed version of the signal having the same base name as shown in FIG. 1. High frequency coefficients QHFREQ2 are inverse transformed by INVERSE DCT 204 and the resulting signal, HPEL, is supplied as an output. Signal HPEL represents a high frequency pel domain version of the original image. Quantized low frequency coefficient prediction error signal QLPERR2 is added to prediction signal PRED2 by adder 206 to generate reconstructed low frequency coefficients RLFREQ2, which are supplied as an output. Reconstructed low frequency coefficients RLFREQ2 are inverse transformed by INVERSE DCT 208 to form a signal LPEL2 which represents a low frequency motion compensation pel domain version of the original image. Adder 210 sums signals LPEL2 and HPEL and supplies the result as output signal VIDOUT. Signal VIDOUT is a full frequency reconstructed version of the original video image signal in the pel domain.

Additionally, low frequency pel signal LPEL2 is supplied to a frame memory 211 of motion compensation prediction unit 212. Motion compensation prediction unit 212 is also supplied with motion vectors MOVECT2. A shifted block of pels, signal MCPEL2, which represents an uncorrected motion compensation predicted version of the low frequency pel domain image is generated by motion compensation prediction unit 212. Signal MCPEL2 is supplied to DCT 214 wherein it is transformed into the frequency domain. The resulting output of DCT 214 is a set of low frequency prediction coefficients, PRED2, which are supplied to abovementioned adder 206. DCT 214 also does not generate any high frequency coefficients.

At start up, to initialize the motion compensation unit and establish a base frame, motion compensation of the low frequency image is suspended for one frame. Thereafter, at predetermined intervals, motion compensation of the low frequency image may be suspended for additional frame periods. This is useful in applications requiring random access from storage such as compact disks or where the image signal is to be transported over a packet network that cannot guaranty 100% delivery for packets that contain the motion vectors and low frequency error signal. Networks that guaranty 100% delivery would not require suspension of motion compensation.

In the encoder (FIG. 1), the time of suspension is determined by a control mechanism (not shown) and effected by changing the logical condition of signal CTRL supplied to motion compensation prediction unit 124. Suspension of motion compensation causes signals MOVECT, MCPEL and PRED to have values of zero (0). Nothing is therefore subtracted from the low frequency coefficients at subtracter 112 and LPERR and low frequency coefficients LFREQ are therefore equal. This causes the low frequency coefficients LFREQ to be directly encoded rather than prediction error signal LPERR and motion vectors MOVECT thereby resulting in the transmission of a new base frame.

Similarly in the receiver (FIG. 2), a corresponding time of suspension of motion compensation is determined by a control mechanism (also not shown) and effected by changing the logical condition of signal CTRL supplied to motion compensation prediction unit 212. When motion compensation is suspended in the encoder (FIG. 1) signal QLPERR2 in the receiver (FIG. 2) is equal to the low frequency coefficients LFREQ (FIG. 1). Suspension of motion compensation causes signals MCPEL2 and PRED2 to have values of zero (0). In turn, signal RLFREQ2 is equal to signal QLPERR2 and correspondingly LPEL2 represents a low frequency base image.

Separating the DCT coefficients has several advantages. First, the low frequency image and the high frequency image can be computed in parallel, since errors introduced by compressing the low frequency information do not translate into additional errors in the high frequency information. Also, since not all DCT coefficients are necessary to generate either the low frequency image or the high frequency image, the entire DCT need not be computed for each, and an intelligent implementation of the DCT can improve the efficiency of the computation. Additionally, a better prediction of the coefficients in the motion-compensation loop is obtained, since fewer coefficients are predicted. Furthermore, by motion-compensating only the low frequencies, the overall image quality is not sacrificed in areas with large motion. In this case motion-compensation cannot adequately predict the high frequencies anyway, so little is lost by not motion compensating them. This coding method has all the advantages for packet transmission inherent in any variable bit-rate method. A balance is struck between data compression and robustness to packet loss, by motion-compensating low frequencies, yet intraframe coding the high frequencies.

An embedded code, as is well known, is a digital code that allows bits or symbols to be dropped and inserted without causing mismatch between the memories of the encoder and the decoder. The encoding and decoding system described above is such a system. Thus, another advantage of this system is that is some of the high frequency coefficients transmitted by the encoder are lost they can be zero-filled at the decoder and an image with less error than prior system swill be displayed. Further, only the low frequency potions of the intraframe coded base frame and subsequent interframe coded frames until and including a desired random frame need be read. These are then combined with the high frequency portion of the desired frame and displayed. Therefore, a high quality image can be randomly accessed more rapidly tan with prior coded video systems.

We claim:

1. Apparatus for use in a video coding system comprising:
   means for receiving as an input an original digitized video image signal;
   means for delaying said video image signal;
   means for deriving frequency transform coefficients from said delayed video image signal;
   means for separating sad frequency transform coefficients into a set of low frequency coefficients and a set of high frequency coefficients, said separation being based upon a predetermined threshold;
   means responsive to said set of low frequency coefficients and said input video image signal for generating and supplying as an output a representation of a motion compensated low frequency version of said original video image signal that includes a set of motion vectors and a prediction error signal;
   means for encoding said set of high frequency coefficients, said prediction error signal and said set of motion vectors into a predetermined format specific to a predetermined output medium; and
   means for interfacing said predetermined format to said predetermined output medium.

2. The apparatus as defined in claim 1 further including elastic storage means for storing said set of high frequency coefficients, said prediction error signal and set of motion vectors and for supplying said set of high frequency coefficients, said prediction error signal and said set of motion vectors as an output to said means for encoding.

3. The apparatus as defined in claim 1 further including means for quantizing said set of high frequency coefficients.

4. The apparatus as defined in claim 1 further including means for generating an initial error signal and means for quantizing responsive to said initial error signal and supplying as an output said prediction error signal.

5. The apparatus as defined in claim 1 wherein said means for generating and supplying includes means for generating a reconstructed low frequency pel domain version of said digitized video image signal, motion compensation prediction means responsive to a current frame of said original digitized video image signal and an at least one stored frame of said reconstructed low frequency pel domain version of said digitized video image signal for generating a motion compensated pel domain prediction signal and motion vectors, means for transforming said motion compensated pel domain prediction signal into said set of low frequency prediction coefficients and means responsive to said set of low frequency coefficients and said st of low frequency prediction coefficients for generating and supplying said prediction error signal.

6. The apparatus as define din claim 5 wherein said means for generating and supplying further includes means for supplying as an output a signal representing a combination of said low frequency prediction coefficients and said prediction error signal to said means for generating said reconstructed low frequency pel domain version of said digitized video image signal.

7. The apparatus as defined in claim 5 wherein said means for generating and supplying further includes means for supplying a quantized version of said frequency domain prediction error signal and means for supplying as an output a signal representing the combination of said low frequency prediction coefficients and quantized version of said frequency domain prediction error signal to said means for generating said reconstructed low frequency pel domain version of said digitized video image signal.

8. The apparatus as define din claim 5 wherein said motion compensation prediction means includes means responsive to a supplied inhibit signal for inhibiting said generation of said motion compensation pel domain prediction signal and said motion vectors.

9. The apparatus as defined in claim 5 wherein said motion compensation prediction means includes means for storing said an at least one frame of said reconstructed low frequency pel domain version of said digitized video image signal.

10. Apparatus for use in a video decoding system comprising:
   means for interfacing to a predetermined input medium for receiving, separating, decoding and supplying as an output a set of high frequency coefficients, a prediction error signal and a set of motion vectors from data supplied from said medium in a predetermined format;
   means for transforming said set of high frequency coefficients into a high frequency pel domain version of an original video image;
   means responsive to said prediction error signal and said set of motion vectors for deriving a motion compensated low frequency pel domain version of said original video image signal;
   means for combining said high frequency pel domain version of said original video image and said motion compensated low frequency pel domain version of said original video image signal into a reconstructed full frequency version of said original video image signal in the pel domain; and
   means for supplying said reconstructed full frequency version of said original video image signal in the pel domain as an output.

11. The apparatus as defined in claim 10 wherein said means for deriving includes motion compensation prediction means responsive to a said motion vectors and an at least one prior stored frame of a reconstructed low frequency pel domain version of said digitized video image signal for generating a current motion compensated prediction pel domain signal, means for transforming said current motion compensated pel domain prediction signal into a set of low frequency prediction coefficients, means responsive to said set of low frequency prediction coefficients and said frequency domain error signal for generating a set of reconstructed low frequency prediction coefficients, means supplied with said reconstructed low frequency prediction coefficients for generating a reconstructed low frequency pel domain version of said digitized video image signal and means for storing said low frequency pel domain version of said digitized video image signal.

12. The apparatus as defined in claim 10 wherein said motion compensation prediction means includes means responsive to a supplied inhibit signal for inhibiting said generation of said current motion compensated prediction pel domain signal.

13. The apparatus as defined in claim 10 wherein said motion compensation prediction means includes means for storing said at least one prior frame of a reconstructed low frequency pel domain version of said digitized video image signal.

14. The apparatus as defined in claim 10 wherein said means for receiving, separating, decoding and supplying further includes means for supplying null value high frequency coefficients if said high frequency coefficients are not supplied from said data within a predetermined length of time.

15. A video coding system method comprising the steps of:
   receiving as an input an original digitized video image signal;
   delaying said video image signal;
   deriving frequency transform coefficients from said delayed video image signal;
   separating said frequency transform coefficients into a st of low frequency coefficients and a set of high frequency coefficients, said separation being based upon a predetermined threshold;
   deriving from said set of low frequency coefficients and said input video image signal a representation of a motion compensated low frequency version of said original video image signal that includes set of motion vectors and a prediction error signal; and
   encoding said set of high frequency coefficients, said prediction error signal and said set of motion vectors into a predetermined format specific to a predetermined output medium.

16. The method as define din claim 15 wherein said step for deriving said representation of a motion compensated low frequency version of said original video image signal includes the steps of generating a reconstructed low frequency pel domain version of said digitized video image signal, storing said reconstructed low frequency pel domain version of said digitized video image signal, generating a motion compensated pel domain prediction signal and motion vectors from a current frame of said original digitized video image signal and an at least one stored frame of said reconstructed low frequency pel domain version of said digitized video image signal, transforming said motion compensated pel domain prediction signal into a set of low frequency prediction coefficients and generating a frequency domain prediction error signal from said set of low frequency coefficients and said st of low frequency prediction coefficients.

17. A video decoding system method comprising the steps of:
   receiving, separating and decoding an encoded set of high frequency coefficients, a prediction error signal and a set of motion vectors from data supplied from a medium in a predetermined format;
   transforming said set of high frequency coefficients into a high frequency pel domain version of an original video image;
   deriving a motion compensated low frequency pel domain version of said original video image signal from said prediction error signal and said set of motion vectors; and
   combining said high frequency pel domain version of said original video image and said motion compensated low frequency pel domain version of said original video image signal into a reconstructed full frequency version of said original video image signal in the pel domain.

18. The method as defined in claim 17 wherein said step for deriving includes the steps of generating a current motion compensated prediction pel domain signal from said motion vectors and an at least one prior stored frame of a reconstructed low frequency pel domain version of said digitized video image signal, transforming said current motion compensated pel domain prediction signal into a set of low frequency prediction coefficients, generating a set of reconstructed low frequency prediction coefficients from said set of low frequency prediction coefficients and said frequency domain error signal, generating a reconstructed low frequency pel domain version of said digitized video image signal from said set of reconstructed low frequency prediction coefficients and storing said low frequency pel domain version of said digitized video image signal.

* * * * *